United States Patent
Michaels

(10) Patent No.: US 6,188,146 B1
(45) Date of Patent: Feb. 13, 2001

(54) SUPPLYING POWER FOR COMMUNICATIONS DEVICES

(76) Inventor: Paris Michaels, P1/8 Spring Street, Bondi Junction NSW 2022 (AU)

(*) Notice: Under 35 U.S.C. 154(b), the term of this patent shall be extended for 0 days.

(21) Appl. No.: 09/316,809

(22) Filed: May 21, 1999

(51) Int. Cl.⁷ .................................................. H02J 7/00
(52) U.S. Cl. .................... 307/150; 362/183; 250/227.11
(58) Field of Search ................ 250/227.11; 362/183; 307/43, 46, 48, 66, 72, 74, 76, 82, 150; 455/550, 572, 573; 323/371; 320/101

(56) References Cited

U.S. PATENT DOCUMENTS

| | | | |
|---|---|---|---|
| 4,050,895 | * | 9/1977 | Hardy et al. ......................... 23/230 R |
| 4,651,019 | * | 3/1987 | Gilbert et al. .......................... 307/43 |
| 5,149,188 | * | 9/1992 | Robbins ................................ 362/183 |
| 5,371,660 | * | 12/1994 | Levens ................................. 362/145 |
| 5,594,325 | * | 1/1997 | Manner ................................ 323/282 |
| 5,684,385 | * | 11/1997 | Guyonneau et al. ................... 320/15 |

* cited by examiner

*Primary Examiner*—Josie Ballato
*Assistant Examiner*—Robert L. Deberadinis
(74) *Attorney, Agent, or Firm*—Oppenheimer Wolff & Donnelly LLP

(57) ABSTRACT

A power supply for providing electrical power to one or more communications components includes energy converting cells configured for mounting on or adjacent a light source such as a street light. Energy dissipated by the light source is converted into electrical energy and used to power one or ore communications components. The power supply combined with a battery, control circuitry and a communications component is provided as a unit to be mounted onto a street light housing. Energy converting cells in the form of thermoelectric converters use the heat from the light housing to power the communications component.

19 Claims, 2 Drawing Sheets

SUPPLYING POWER FOR COMMUNICATIONS DEVICES

FIELD OF THE INVENTION

The invention relates to communications devices, and, more particularly, to supplying power to such devices in a cost and resource effective manner.

The invention has been developed primarily for simplifying installation of small cell high speed telecommunications networks in urban and suburban areas, and will be described within this document with reference to that specific application. However, it will be appreciated that the invention is not limited to this field.

BACKGROUND OF THE INVENTION

Present generation telecommunications networks typically rely on base stations having a cell size (that is, a transmission and reception footprint) of the order of one kilometer in radius. Smaller cells are occasionally used to fill transmission and reception gaps caused by terrain or structural interference.

Large cells in telecommunications networks have worked adequately with previous generation protocols and transmission rates. However, next and future generation networks have substantially increased bandwidth requirements due to increases in the number of users, user population per unit area and the users' telecommunications demands. Unfortunately, signal quality in RF networks falls logarithmically with distance from a transmitter/receiver.

One way to reconcile this need for higher bandwidth to larger numbers of users is to reduce the size of transmission and reception cells from about one kilometer in radius to hundreds of meters. Such small cell telecommunications networks are sometimes referred to as microcellular networks. Unfortunately, smaller cell size and the corresponding use of relatively low power microcellular base stations can lead to increased rates of service outage due to more nulls in the coverage area. The resultant poor service quality is an impediment to customer acceptance of such new networks.

To avoid these problems, it is necessary to ensure easy deployment of the requisite base stations so that large numbers can de deployed quickly as the network is initially installed and additional elements can quickly and flexibly added to network to minimise holes in the service area after installation.

A substantial limiting factor in the rapid and flexible deployment of such communications devices is the need to supply each of them with power. Whilst each base station may nit, in itself, consume a great deal of power, there are power installation and maintenance overheads incurred for each base station. When the base stations are about two kilometers apart, as in current generation telecommunications networks, these overheads are relatively low per unit of area covered. However, the overheads become onerous when power needs to be individually supplied and maintained to each base station every few hundred meters. These overheads are a serious impediment to the rapid and cost effective deployment of the relatively large numbers of base stations required in next generation telecommunications networks.

Exacerbating the problem is the desire to provide an elevated position for each base station, to ensure better transmission and reception, and to place each base station physically out of reach of vandals. There is also a definite advantage to providing flexibility of placement of each base station within a telecommunications network to most economically minimise nulls and poor service areas.

It is an object of the invention to overcome or at least substantially ameliorate one or more of the disadvantages of the prior art.

SUMMARY OF THE INVENTION

According to a first aspect of the invention there is provided a power supply for providing electrical power to one or more communications components, the power supply including:

one or more energy converting cells configured for mounting on or adjacent a light source to convert energy dissipated by the light source into electrical energy; and a battery, wherein the energy conversion cell provides an electrical output to the battery which in turn, in use, provides power to the one or more communications components.

Preferably, the power supply includes a charging circuit electrically disposed intermediate to one or more energy conversion cells and the battery to regulate the electrical output from the one or more energy conversion cells.

Preferably, one or more of the energy conversion cells is a thermoelectric cell converter disposed in thermal communications with the light source. More preferably, the thermoelectric cell converter is a layered device, the layers being arranged in an optimised order such that those materials with peak thermoelectric efficiency at higher temperatures are closer to the light source that those with peak efficiencies at lower temperature. Preferably, at least one layer includes $Bi_2Te_{2.4}Se_{0.6}$ material. Preferably also, at least one layer includes PbTe multiple beam epitaxially grown multiple quantum well material. Preferably, at least one layer includes $Zn_4Sb_3$ material.

Preferably, one or more of the energy converting cells is a photovoltaic cell converter in optical communication with the light source. In a preferred embodiment, the photovoltaic cell converter includes a light guide disposed intermediate the light source and the photovoltaic cell converter for guiding light therebetween. Preferably also, the photovoltaic cell converter is optimised to the for infra-red radiation conversion for salvaging radiant energy from the light source itself or re-radiated from a thermoelectric cell converter mounted on or adjacent the light source.

In a particularly preferred embodiment, one or more of the energy conversion cells is a solar cell converter for converting incident sunlight into electrical energy and providing a source of supplementary power to the battery.

Preferably, the light source includes an adjacent light source housing for mounting the energy conversion cell thereto. More preferably, the light source is an elevated street light.

According to a second aspect of the invention, there is provided a communications device including a power supply as recited above, and one or more communications components, wherein, in use, the components are electrically connected to and powered by the battery. Preferably, the one or more network communication components is mounted on or adjacent the light source housing with the power supply.

According to a third aspect of the invention, there is provided a communications network including a plurality of the telecommunications network devices.

Preferably, the communications network element utilises radio frequency (RF) signals for transmitting or receiving communication signals. In other preferred embodiments, the communications network element is optical.

In a fourth aspect of the invention, there is provided a communications network device including:

a power supply including one or more energy conversion cells for converting energy dissipated by a light source into electrical energy; and a communication component powered by the electrical energy from the power supply;

wherein the communications network device is configured to be mounted to a housing adjacent the light source.

Preferably, the energy conversion cells include at least one thermoelectric converter for converting heat energy dissipated by the light source into the electrical energy.

Preferably, the communications network device is configured for mounting to a street light housing, such that, when the communications network device is so mounted, at least one of the thermoelectric converters is in close thermal contact with the streetlight housing.

BRIEF DESCRIPTION OF THE DRAWINGS

Preferred embodiments of the invention will now be described, by way of example only, with reference to the accompanying drawings, in which.

DETAILED DESCRIPTION OF PREFERRED EMBODIMENTS

Figure 1:
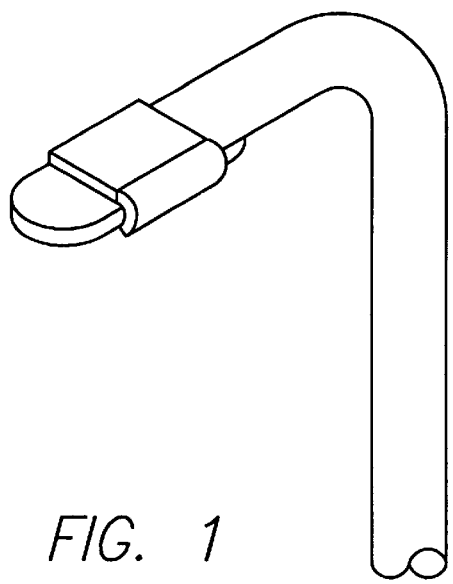
FIG. 1 illustrates a communications network device mounted on a street light cover, the power supply being in accordance with the invention.

Referring to the drawings a power supply 1 includes an energy converting cell 3 in the form of a thermoelectric cell converter 4 which, in this embodiment, is mounted to a housing 6 of a light source in the form of an elevated street light 5. In other embodiments, the energy converting cell can be mounted on or adjacent a different heat source, such as an illuminated advertising sign or the like. However, the relatively high power dissipation of street lights in particular means that they are peculiarly suited for use with the invention.

The power supply 1 further includes a rechargeable battery 7 which receives electrical energy from the thermoelectric cell converter 4 of the energy conversion cell 3. In other embodiments the battery 7 is a rechargeable battery, such as a lithium ion, NiMH or other suitable rechargeable battery type. A charging circuit 8 is electrically disposed intermediate the energy conversion cell 3 and the battery 7 to regulate the electrical output from the energy conversion cell 3.

In use, the thermoelectric cell converter 4 converts energy dissipated by the street light 5 into electrical energy, which in turn is used to charge the battery 7 via the charging circuit 8.

Figure 2:
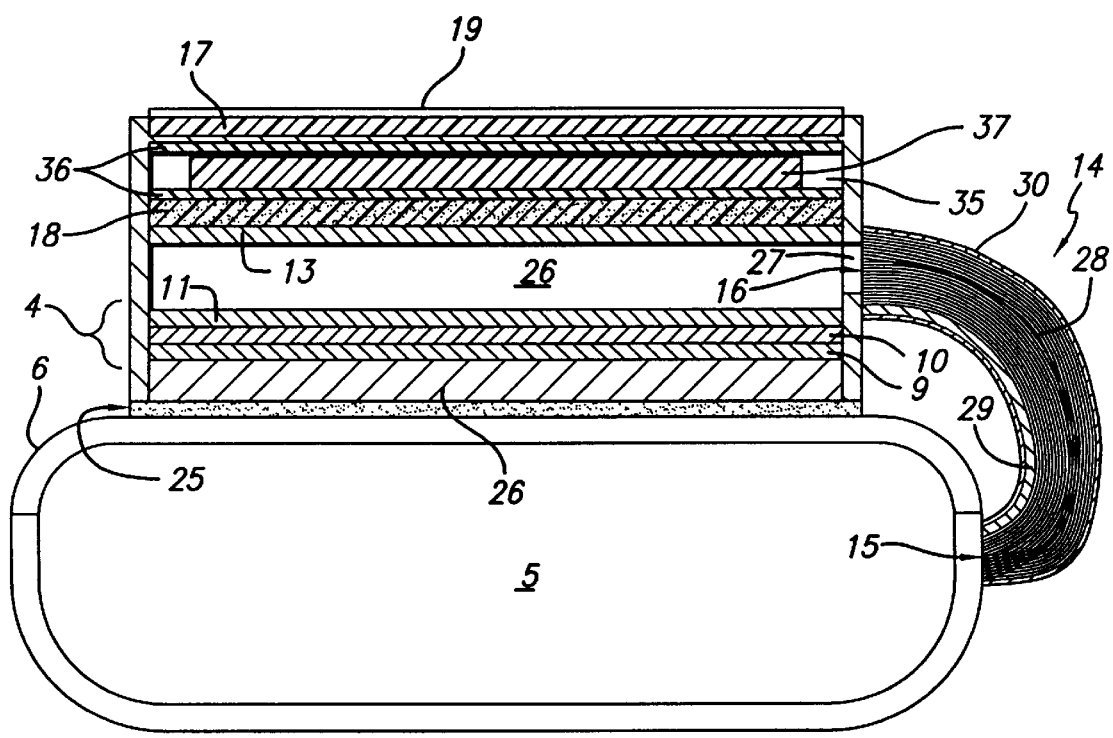
FIG. 2 is a cross sectional diagrammatic view of an energy conversion cell of FIG. 1.

As is best shown in FIG. 2, the thermoelectric cell converter 4 is maintained in thermal communication with the street light housing 6 by means of a thermal transmission layer 25 formed from a conductive cohesive medium disposed intermediate the streetlight housing 6 and the thermoelectric cell converter 4. Preferably, the thermally cohesive medium is a thermal grease or other flowable or pliable material that conducts heat well.

In the embodiments shown, the thermoelectric cell converter 4 is a layered device. In the preferred embodiment, alternating n-type and p-type layers are arranged in a predetermined order such that the respective layers' peak thermoelectric conversion efficiency temperatures decrease with distance from the street light housing 6 to which the thermoelectric conversion cell 4 is mounted.

In the embodiment illustrated, the thermoelectric cell converter 4 includes a first layer 9 of $Bi_2Te_{2.4}Se_{0.6}$ material, a second layer 10 of PbTe multiple beam epitaxially grown multiple quantum well material and a third layer 11 of $Zn_4Sb_3$ material. The layers can be formed on or at least be attached to a thermal reservoir base place 26, which is in turn bolted or otherwise attached to the street light housing 6.

In preferred embodiments, the energy converting cell 3 also includes a photovoltaic cell converters 13 disposed within a first cavity 26 lined with reflective materials. An aperture 27 in the side of the first cavity 26 allows light to enter, which is converted by the photovoltaic cell converters 13. In the preferred embodiment illustrated, light is piped from the street light 5 to the aperture 27 by means of a light guide 14. In the preferred embodiment, the light guide 14 takes the form of a flexible armature that includes a bundle of optic fibres 28 reinforced with pliable wire ribbing 29 and an outer protective layer 30. Light enters the light guide 14 at an input end 15 adjacent the light, and exits at an output end 16 adjacent the power supply. This light guide arrangement has the advantage of being customisable in situ so that it can best be positioned to take advantage of any given street light structure.

In other embodiments, the light guide 14 includes a pathway defined by a mirrored surface. Light passing within the guide is then prevented from leaving it by totally reflecting from the mirrored surface.

The photovoltaic cell converter 13 is optimised for infrared radiation conversion for salvaging radiant energy from the street light 5 itself or from the thermoelectric cell converter 4 due to re-radiation. In other embodiments, the photovoltaic cell converter 13 provides broad spectral response so that at least some of the visual light generated by the street light 5 is converted to electrical energy by the photovoltaic cell converter 13. The internal reflective surfaces of the first cavity 26 help guide incoming light to the photovoltaic cell converters 13.

In the preferred embodiment, the energy conversion cell 3 further includes a solar cell converter 17 for converting incident sunlight into electrical energy, thereby providing a source of supplemental power to the battery. The solar cell converter 17 is insulated from the intracavity photovoltaic cell converter 13 by means of an optically opaque layer 18 which is also an electrical insulator. Preferably, the insulating layer 18 is a composite material loaded with silica or carbon aerogel.

The various circuitry is carried in a payload cavity 35, which is itself lined with low temperature thermoelectric cells 36. In this way, further energy is reclaimed for re-use by the communications component. It will be appreciated that some or all of the circuitry can be carried in the payload cavity 35, including the charging circuit 8 and some or all of the circuitry associated with a communications component powered by the power supply. For the sake of compactness, the battery 7 can also be contained in the payload cavity 35.

In other embodiments, the solar cell converter 17 is mounted on or adjacent the streetlight housing 6 and spaced apart from the energy conversion cell 3. In the preferred form, the solar cell converter 17 includes a micro-lens 19 for concentrating sunlight onto the solar cell converter 17. Preferably, the micro-lens 19 is a Fresnel lens. In other exemplary embodiments, the micro-lens is a light guide disposed intermediate the solar cell converter and daylight for guiding light therebetween.

Thermoelectric materials are available having high thermoelectric conversion efficiency in the range of temperatures between 300° K. and 700° K. The figure of merit of thermoelectric materials is usually expressed in terms of a quantity denoted Z. The best known materials have a Z value in the range $2–4 \times 10^{-3}$ $K^{-1}$ at 350K. Due to the temperature dependence of the figure of merit, the efficiency is often indicated in terms of ZT, which is a function of thermal and electrical conductivity, thermopower and temperature. Each material has a characteristic range of temperatures at which power conversion is most efficient. Thus, the overall performance of a thermoelectric cell is improved by cascading multiple layers with the highest temperature materials preceding the lower temperature materials in order of thermal contact with the heat reservoir.

Notably, low temperature operation can be achieved by using a suitable material such as $Bi_2Te_{2.4}Se_{0.6}$ which has a peak of Z of $2.5 \times 10^{-3}$ $K^{-1}$ at approximately 350° K., dropping to $2 \times 10^{-3}$ $K^{-1}$ at approximately 450K.

PbTe multiple quantum wells grown by molecular beam epitaxy methods have been reported with ZT>1.2 at room temperature. A relatively inexpensive material, $Zn_4Sb_3$, has a peak ZT of 1.3 at 673K, which also bridges the gap in peak efficiency between alloys and bulk PbTe. Other materials are known with large ZT values and considerable research is under way to discover more efficient thermoelectric materials. It will be appreciated by those skilled in the art that various thermoelectric materials may be matched to suit the thermal gradients of the heat source and the availability of other thermoelectric materials can be exploited without departing from the spirit of the invention.

Figure 3:
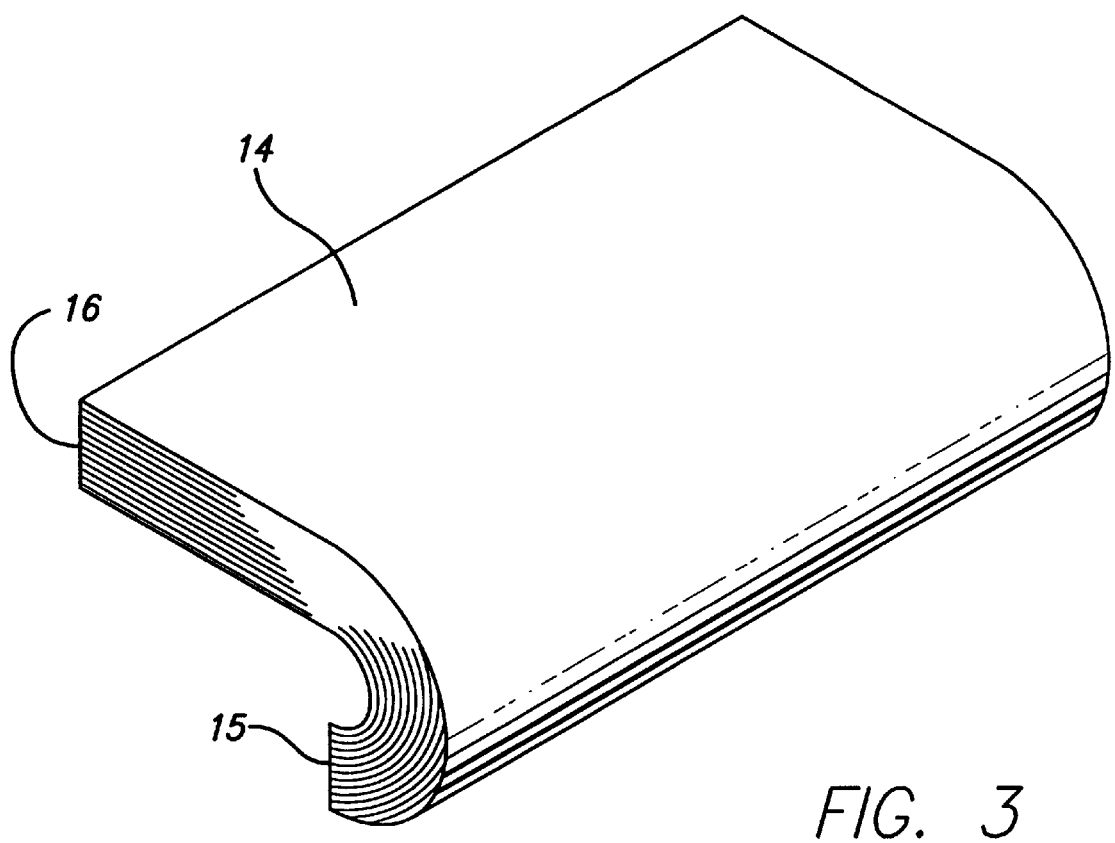
FIG 3 illustrates a light guide for disposal intermediate the light source and the photovoltaic cell converter for guiding light therebetween, for use in an alternative embodiment of the invention.

The actual number of layers will vary from application to application, and will frequently include more than the three layers of the embodiment of FIG. 3. The layers can also be of varying thickness, composition, doping, microscopic structure and treatments, depending upon the desired electrical output. Usually, the desire will be to produce a layered construction that provides a relatively smooth ZT gradient, thereby maximising the amount of energy scavenged from the heat source the conversion cell is designed to be used with.

In some embodiments, the energy converting cells 3 are thermoelectric only whilst in other embodiments, the energy converting cells 3 are photovoltaic only. In yet other embodiments, the energy converter cells 3 includes a thermoelectric cell converter 4 or a photovoltaic cell converter 13, and a solar cell converter 17.

Figure 4:
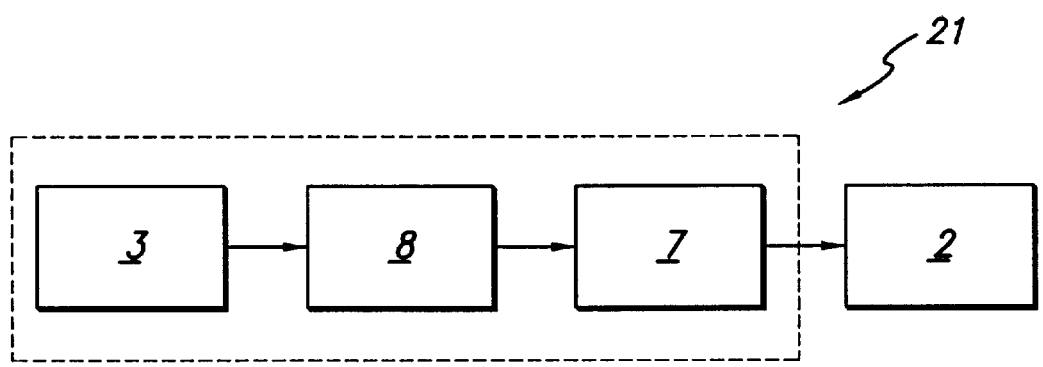
FIG. 4 is a schematic block diagram of a communications network element according to the invention.

FIG. 4 shows the basic components of the preferred form of the invention and their electric interconnection. This embodiment includes the power supply 1, and one or more communications components 2 mounted on or adjacent the light source housing 6. In use, the components are electrically connected to and powered by the power supply 1. In some embodiments, the network communication component 2 is in the form of a transmitter/receiver. In other embodiments the component 2 is in the form of a receiver. In other exemplary embodiments, the component 2 is in the form of a transmitter.

In yet another embodiment, the exemplary embodiment takes the form of a communications network (not illustrated) which includes a plurality of the communications devices according to any of the previous embodiments, utilising radio frequency waves for transmitting or receiving communication signals. In some embodiments, the communications network is optical. In other embodiments, the communications network is cellular.

In embodiments of the invention utilising optical (and, in particular, "radio over fibre") means for transmitting and/or receiving communication signals, a driving laser source may selectively be switched to provide laser power to the photovoltaic cell converter 13. Preferably, a predetermined portion of the laser light is switched to the photovoltaic cell converter 13.

At lest in its preferred embodiments, the present invention provides a novel means of powering a communications network by scavenging energy dissipated from a light source. In the preferred embodiment, the invention is particularly useful due to the use of an elevated light source to power communications elements that must themselves be elevated. This results in both the efficient use of energy that would otherwise be dissipated in a wasteful form, as well as supplying electrical energy to components which must themselves be elevated to work effectively. The energy provided is effectively free, notwithstanding start-up costs, and enables rapid deployment of self-powered communications devices, especially for microcellular networks. An added advantage is the lower level of skill required to install the devices, since there is no need to supply and connect live, relatively high-voltage, power to the devices. Finally, the devices according to various aspect of the invention take advantage of wasted real estate in the form of street light housing surfaces which otherwise have no use. The synergistic combination of these components results in an invention which offers commercially significant advantages over the prior art.

Although the invention has been described with reference to particular embodiments, it will be appreciated by those skilled in the art that the invention may be embodied in many other forms.

The claims defining the invention are as follows:

1. A power supply for providing electrical power to one or more communications components, the power supply including:
   one or more energy converting cells configured for mounting on or adjacent a light source to convert energy dissipated by the light source into electrical energy;
   a battery, wherein the energy conversion cell provides an electrical output to the battery which in turn, in use, provides power to the one or more communications components, and
   wherein the one or more energy conversion cells is a thermoelectric cell converter disposed in thermal communication with the light source.

2. A power supply according to claim 1, wherein the thermoelectric cell converter is a layered device, the layers being arranged in a predetermined order such that the respective layers' intrinsic temperature sensitivities decrease with distance from the light source at or adjacent to which the one or more energy converting cells are disposed.

3. A power supply according to claim 2 wherein at least one layer includes $Bi_2Te_{2.4}Se_{0.6}$ material.

4. A power supply according to claim 2 wherein at least one layer includes PbTe multiple beam epitaxially grown multiple quantum well material.

5. A power supply according to claim 2 wherein at least one layer includes $Zn_4Sb_3$ material.

6. A communications network device including:
   a power supply including one or more energy conversion cells for converting energy dissipated by a light source into electrical energy;
   a communication component powered by the electrical energy from the power supply;
   wherein the communications network device is configured to be mounted to a housing adjacent the light source; and
   wherein the energy conversion cells include at least one thermoelectric converter for converting heat energy dissipated by the light source into the electrical energy.

7. A communications network device according to claim 6, configured for mounting to a street light housing, such that, when the communications network device is so mounted, at least one of the thermoelectric converters is in close thermal contact with the streetlight housing.

8. A communications network device according to claim 7, further including a thermal reservoir disposed between the thermoelectric converters and the street light housing.

9. A communications network device according to claim 8, wherein the thermal reservoir is a metallic plate.

10. A communications network device according to claim 9, further including a pliable thermal compound disposed on the metallic plate such that, in use, the thermal compound is disposed between the street light housing and the thermal reservoir for transferring heat therebetween.

11. A communications network device according to claim 6, wherein the thermoelectric converter includes a plurality of thermoelectric conversion layers.

12. A communications network according to claim 11, wherein the layers are arranged in a predetermined order such that, in use, the respective layers' intrinsic temperature sensitivities decrease with distance from the street light housing.

13. A communications network device according to claim 12, wherein at least one layer includes $Bi_2Te_{2.4}Se_{0.6}$ material.

14. A communications network device according to claim 11, wherein at least one layer includes PbTe multiple beam epitaxially grown multiple quantum well material.

15. A communications network device according to claim 11, wherein at least one layer includes $Zn_4Sb_3$ material.

16. A communications network device according to claim 6, wherein the communications component is a cellular, microcellular or picocellular base station.

17. A communications network accordingly to claim 6, including a plurality of the communications network devices.

18. A communications network according to claim 17, wherein the communications component utilises radio frequency (RF) waves for transmitting or receiving communication signals.

19. A communications network according to claim 6, wherein the communications component communicates by optical means.

* * * * *